(12) United States Patent
Cao et al.

(10) Patent No.: US 11,444,285 B2
(45) Date of Patent: Sep. 13, 2022

(54) THREE-DIMENSIONAL ANODE CURRENT COLLECTOR FOR LITHIUM BATTERIES

(71) Applicant: Nissan North America, Inc., Franklin, TN (US)

(72) Inventors: Jinwei Cao, New Hudson, MI (US); Yunhui Gong, Farmington Hills, MI (US)

(73) Assignee: Nissan North America, Inc., Franklin, TN (US)

( * ) Notice: Subject to any disclaimer, the term of this patent is extended or adjusted under 35 U.S.C. 154(b) by 219 days.

(21) Appl. No.: 16/804,614

(22) Filed: Feb. 28, 2020

(65) Prior Publication Data

US 2021/0273233 A1 Sep. 2, 2021

(51) Int. Cl.
| | |
|---|---|
| *H01M 4/70* | (2006.01) |
| *H01M 10/052* | (2010.01) |
| *H01M 4/66* | (2006.01) |
| *H01M 4/13* | (2010.01) |
| *H01M 4/02* | (2006.01) |

(52) U.S. Cl.
CPC .............. *H01M 4/70* (2013.01); *H01M 4/13* (2013.01); *H01M 4/664* (2013.01); *H01M 4/667* (2013.01); *H01M 10/052* (2013.01); *H01M 2004/021* (2013.01); *H01M 2004/027* (2013.01)

(58) Field of Classification Search
CPC .......... H01M 4/70; H01M 4/13; H01M 4/664; H01M 4/667; H01M 10/052; H01M 2004/021; H01M 2004/027
See application file for complete search history.

(56) References Cited

U.S. PATENT DOCUMENTS 6,432,586 B1 8/2002 Zhang
2021/0020921 A1* 1/2021 Zhang ................ H01M 50/103
2021/0399336 A1* 12/2021 Kim .................. H01M 10/0525

FOREIGN PATENT DOCUMENTS

WO 2008072460 A1 6/2008
WO 2017112804 A1 6/2017
WO 2017150354 A1 9/2017

* cited by examiner

*Primary Examiner* — Christopher P Domone
*Assistant Examiner* — Kimberly Wyluda
(74) *Attorney, Agent, or Firm* — Young Basile Hanlon & MacFarlane, P.C.

(57) ABSTRACT

A lithium metal battery has a cathode current collector, a cathode active material layer, an electrolyte, and an anode current collector host structure interfacing with the electrolyte. The anode current collector host structure comprises a conductive layer, a non-conductive layer on the conductive layer, and recesses formed through the non-conductive layer and into the conductive layer, each recess having an opening in the non-conductive layer with a width that is smaller than a largest width of the recess.

20 Claims, 2 Drawing Sheets

THREE-DIMENSIONAL ANODE CURRENT COLLECTOR FOR LITHIUM BATTERIES

TECHNICAL FIELD

This disclosure relates to three-dimensional current collectors to host lithium deposition, an in particular to three-dimensional current collector structures in lithium metal batteries.

BACKGROUND

Lithium metal batteries have a higher energy density than conventional lithium ion batteries. However, non-uniform electrodeposition of lithium, which results in dendrites, is holding back the widespread adoption of lithium metal batteries. During battery operation, lithium is continuously deposited and removed. As the lithium is deposited, it may not deposit uniformly, forming dendrites, which are tiny, rigid branch-like structures and needle-like projections. The formation of dendrites results in a non-uniform lithium surface which further exasperates non-uniform lithium deposition. As the dendrites grow from this non-uniform deposition, battery deterioration can occur as the lithium dendrites reach the other electrode, short circuiting the battery.

SUMMARY

Disclosed herein are implementations of anode current collector host structures and lithium metal battery cells and batteries incorporating the anode current collector host structures.

A lithium metal battery as disclosed herein has a cathode current collector, a cathode active material layer, an electrolyte, and an anode current collector host structure interfacing with the electrolyte. The anode current collector host structure comprises a conductive layer, a non-conductive layer on the conductive layer, and recesses formed through the non-conductive layer and into the conductive layer, each recess having an opening in the non-conductive layer with a width that is smaller than a largest width of the recess.

An anode current collector host structure as disclosed herein is configured to interface with an electrolyte. The anode current collector host structure comprises a conductive layer of metal, a non-conductive layer formed on the conductive layer, and recesses formed across an entire cathode-facing surface of the non-conductive layer, through the non-conductive layer and into the conductive layer, each recess having an opening in a cathode-facing surface of the non-conductive layer with a width that is smaller than a largest width of the recess, wherein the electrolyte at least partially fills the recesses.

Another lithium metal battery as disclosed herein comprises a cathode current collector, a cathode active material layer comprising a lithium transition metal oxide or a lithium transition metal phosphate, an electrolyte that is a liquid, gel, polymer or combination thereof, and an anode current collector host structure interfacing with the electrolyte. The anode current collector host structure comprises a conductive layer of metal, a non-conductive layer formed on the conductive layer, and recesses formed through the non-conductive layer and into the conductive layer, each recess having an opening on a cathode-facing surface of the non-conductive layer with a width that is smaller than a largest width of the recess, the width of the opening being between 20% and 70% the largest width of the recess.

Other aspects and implementations of anode current collector host structures and lithium metal battery cells and batteries incorporating the anode current collector host structures as discussed herein.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Lithium metal batteries have a higher energy density than conventional lithium ion batteries. During battery operation, lithium is continuously deposited and removed. However, as the lithium is deposited, it may not deposit uniformly, forming dendrites. The formation of dendrites results in a non-uniform lithium surface which further exasperates non-uniform lithium deposition. As the dendrites grow from this non-uniform deposition, battery deterioration can occur as the lithium dendrites reach the other electrode, short circuiting the battery.

Attempts to reduce dendrite formation include providing a host current collector for lithium to deposit. However, to date, host current collector designs have not been able to fully restrict the growth of lithium dendrites within the host, continuing to lead to short circuiting and battery deterioration. Disclosed herein are anode current collector host structures having a multi-material design and a structure designed to capture the lithium deposition within the host structure. The anode current collector host structures disclosed herein improve the cycle life and the quick chargeability of the lithium metal batteries in which they are incorporated.

Figure 1:
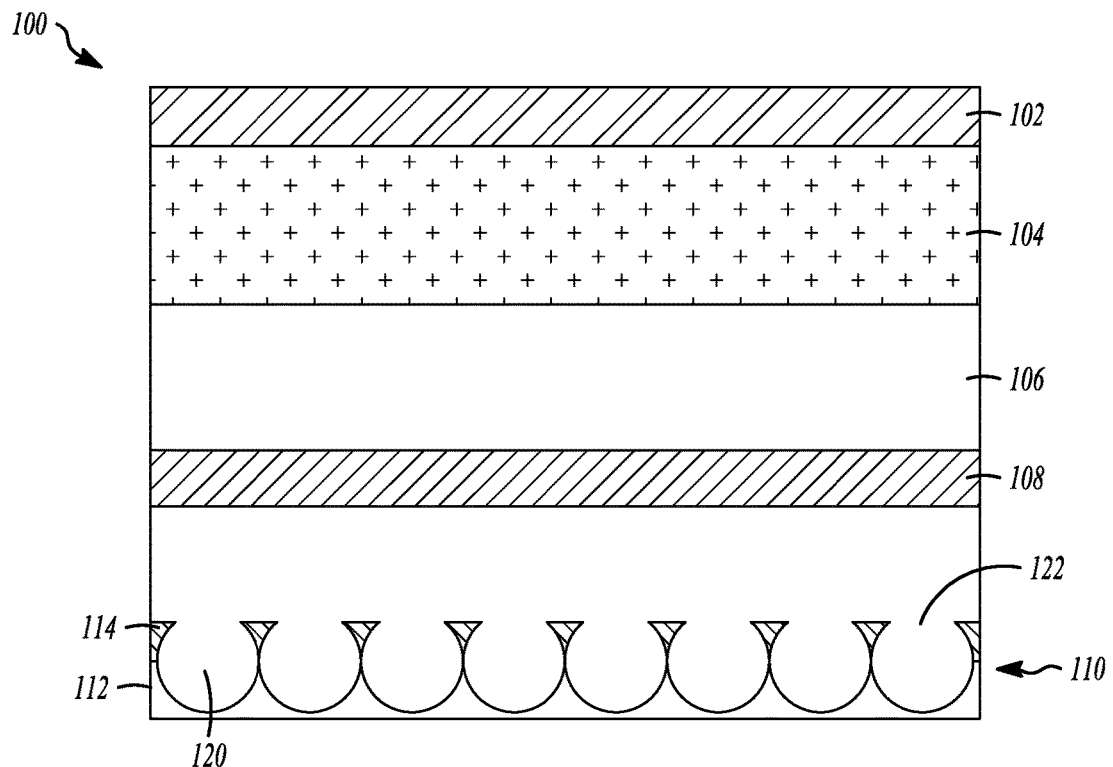
FIG. 1 is a cross-sectional view of a lithium metal battery cell as disclosed herein.
Figure 2:
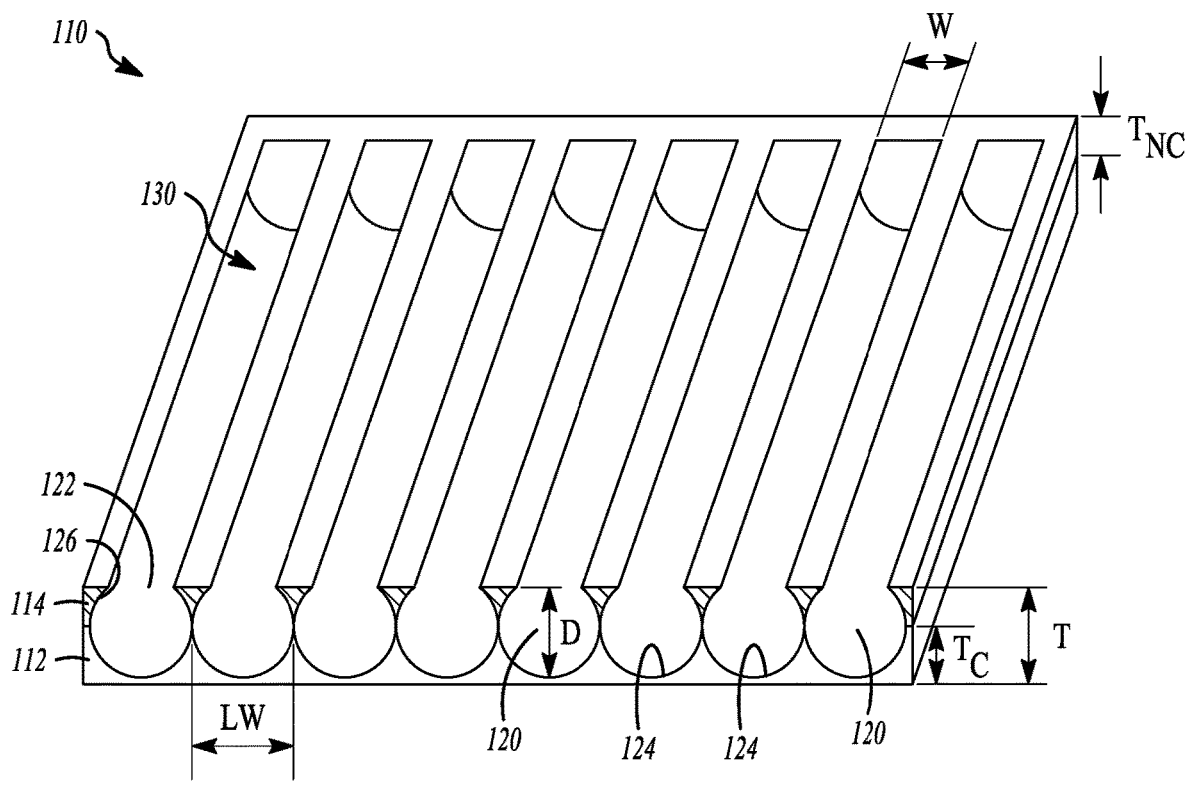
FIG. 2 is perspective cross-sectional view of an anode current collector host structure as disclosed herein.

A lithium metal battery 100 as disclosed herein is illustrated in FIG. 1. The lithium metal battery 100 includes a cathode current collector 102, a cathode active material layer 104, an electrolyte 106, and an anode current collector host structure 110 interfacing with the electrolyte 106. In some embodiments, the lithium metal battery 100 may include a separator 108 in the electrolyte 106.

The cathode current collector 102 can be, for example, an aluminum sheet or foil. The cathode active material layer 104 can include one or more lithium transition metal oxides and lithium transition metal phosphates which can be bonded together using binders and optionally conductive fillers such as carbon black. Lithium transition metal oxides and lithium transition metal phosphates can include, but are not limited to, $LiCoO_2$, $LiNiO_2$, $LiNi_{0.8}Co_{0.15}Al_{0.05}O_2$, $LiMnO_2$, $Li(Ni_{0.5}Mn_{0.5})O_2$, $LiNi_xCo_yMn_zO_2$, Spinel $Li_2Mn_2O_4$, $LiFePO_4$ and other polyanion compounds, and other olivine structures including $LiMnPO_4$, $LiCoPO_4$, $LiNi_{0.5}Co_{0.5}PO_4$, and $LiMn_{0.33}Fe_{0.33}Co_{0.33}PO_4$. The cathode active material layer 104 can include sulfur for a lithium sulfur battery. The cathode active material layer 104 can also be an air cathode.

In some embodiments, the electrolyte may include a liquid electrolyte, a polymer ionic liquid, a gel electrolyte, or a combination thereof. The electrolyte can be an ionic liquid-based electrolyte mixed with a lithium salt. The ionic liquid may be, for example, at least one selected from N-Propyl-N-methylpyrrolidinium bis(flurosulfonyl)imide, N-methyl-N-propylpyrrolidinium bis(trifluoromethanesulfonyl)imide, N-butyl-N-methylpyrrolidinium bis(trifluoromethylsulfonyl)imide, 1-butyl-3-methylimidazolium bis(trifluoromethylsulfonyl)imide, and 1-ethyl-3-methylimidazolium bis(trifluoromethylsulfonyl)imide. The salt can be or include, for example, a fluorosulfonyl (FSO) group, e.g., lithium bisfluorosulfonylimide $(LiN(FSO_2)_2$, (LiFSI), $LiN(FSO_2)_2$, $LiN(FSO_2)(CF_3SO_2)$, $LiN(FSO_2)(C_2F_5SO_2)$. In some embodiments, the electrolyte is or includes a cyclic carbonate (e.g., ethylene carbonate (EC) or propylene carbonate, a cyclic ether such as tetrahydrofuran (THF) or tetrahydropyran (TH), a glyme such as dimethoxyethane (DME) or diethoxyethane, an ether such as diethylether (DEE) or methylbutylether (MBE), their derivatives, and any combinations and mixtures thereof.

Where a separator 108 is used, such as with a liquid electrolyte, the separator 108 can be a polyolefine or a polyethylene, as non-limiting examples.

The anode current collector host structure 110 has a conductive layer 112 and a non-conductive layer 114 on the conductive layer 112 so that the conductive layer 112 is further from the cathode active material layer 104 than the non-conductive layer 114. The layers 112, 114 are better seen in FIGS. 2-5, which are enlarged illustrations of the anode current collector host structures disclosed herein.

The conductive layer 112 can be made of metal, such as copper, nickel, titanium or stainless steel. The conductive layer 112 may also made of an electron conducting polymer. The conductive layer 112 may be made of a composite with metal and an electron conducting polymer. The non-conductive layer 114 may be non-conductive to both ions and electrons and made from a material such as ceramic or a polymer that is impervious to electrolytes. The non-conductive layer 114 may be non-conductive to electrons only, while being conductive of ions. Such a non-conductive layer 114 can be made of a solid ceramic electrolyte or a composite thereof with a polymer.

Recesses 120 are formed through the non-conductive layer 114 and into the conductive layer 112. The recesses 120 increase the surface area of the interface between the anode current collector and the electrolyte 106. The recesses 120 provide greater surface area on which the lithium can deposit, as well as a space to host the lithium deposition. This three-dimensional structure with increased surface area results in fewer dendritic growth, resulting in a lower current density.

Each recess 120 is formed having an opening 122 in the non-conductive layer 114 and extending through the non-conductive layer 114 and into the conductive layer 112 without going all the way through the conductive layer 112. For example, the anode current collector host structure 110 can have an overall thickness T, and the recess can have a depth D that is between 50% and 95% the thickness, provided the recess extends into the conductive layer 112. The overall thickness T of the anode current collector host structure 110 can be between about 5 μm and 50 μm. The thickness of the conductive layer 112 and the non-conductive layer 114 can be the same or can be different. For example, the non-conductive layer 114 can have a thickness $T_{NC}$ that is between 30% and 70% of the thickness T of the anode current collector host structure 110. Whatever the thickness of the conductive layer 112 and the non-conductive layer 114 and the depth D of the recess 120 within the dimensions disclosed, a surface 124 of the conductive layer 112 is exposed to provide a surface on which the lithium deposits. The thinner the non-conductive layer 114 and the thicker the conductive layer 112, the more surface 124 of the conductive layer 112 that can be exposed for lithium deposition inside the recess 120. The non-conductive layer 114 can have a thickness $T_NC$ that is between 10% and 100% of the thickness Tc of the conductive layer 112, and more particularly, between 10% and 60% the thickness Tc of the conductive layer 112.

The opening 122 of each recess 120 formed in the non-conductive layer 114 has a width W that is smaller than a largest width LW of the recess 120. The width W of the opening 122 of the recess 120 can be between 20% to 70% the largest width LW of the recess 120. See, for example, FIG. 2, in which the recesses 120 are formed as channels 130 extending along one of the x or y direction of the anode current collector. The channels 130 can extend along an entire dimension of the anode current collector or can extend along a lesser length of the anode current collector. Each channel 130 is formed such that the width W of the opening 122 is less than the largest width LW of the channel 130. The channel 130 is illustrated having a shape that is rounded with a concave surface 124. This is provided by means of example. The channel 130 can be of other shapes, provided the opening 122 is smaller than the largest width LW of the channel 130.

Figure 3:
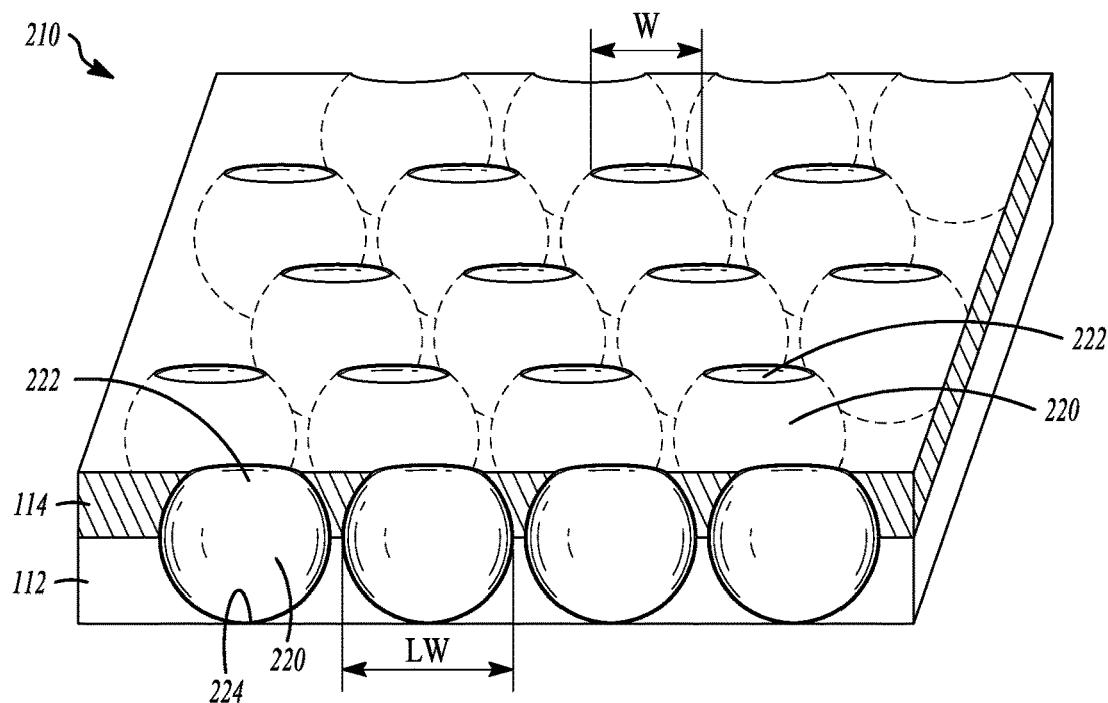
FIG. 3 is perspective cross-sectional view of another anode current collector host structure as disclosed herein.

FIG. 3 is another example of an anode current collector host structure 210 as disclosed herein. The anode current collector host structure 210 is similar to anode current collector host structure 110, except that the recesses 120 are holes 220 formed with the opening 222 in the non-conductive layer 114 with the hole 220 extending into the conductive layer 112 as illustrated. Each hole 220 is formed such that the width W of the opening 222 is less than the largest width LW of the hole 220. The hole 220 is illustrated having a shape that is rounded with a concave surface 224. This is provided by means of example. The hole 220 can be of other shapes, provided the opening 222 is smaller than the largest width LW of the hole 220.

The recesses 120 can be formed so fit as many recesses as possible along the surface area of the recess while still maintaining the necessary mechanical strength of the anode current collector. The greater the number of recesses 120, the larger the surface area available for lithium to deposit. However, fewer recesses 120 can be formed as desired or required.

Figure 4:
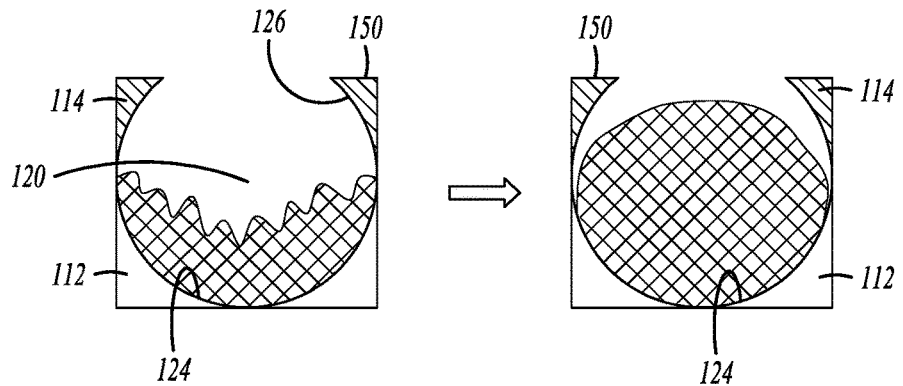
FIG. 4 is a schematic illustrating lithium deposition within a recess of the anode current collector host structure.

As illustrated in FIG. 4, the lithium will only deposit on the surface 124 of the conductive layer 122 and will not deposit on the surface 126 of the non-conductive layer 114. The combination of the conductive and non-conductive materials and the structure of recess 120 with an opening 122 smaller than the largest width LW of the recess 120 prevents growth of dendrites and prevents deposition of lithium on a top surface 150 of the anode current collector host structure 110. The option to have the non-conductive layer 114 be only conductive to ions provides a safety net such that if the opening 122 of a recess 120 becomes blocked with lithium, lithium ions can pass through the non-conductive layer 114 to the conductive layer 112.

The anode current collector host structure 110 interfaces with the electrolyte 106. Accordingly, the electrolyte 106 will fill any space in the recesses 120.

Figure 5:
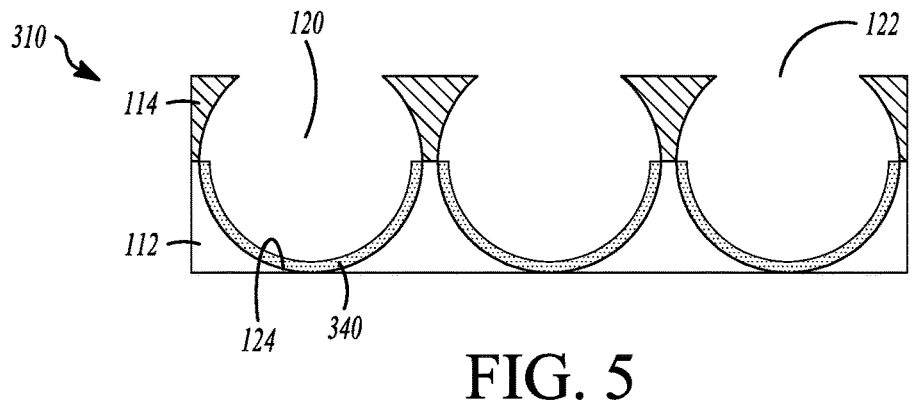
FIG. 5 is a cross section view of an anode current collector host structure having a coating on an interior surface of the conductive layer.

FIG. 5 illustrates an example of an anode current collector host structure 310 that is similar to the anode current collector host structures 110, 210 previously described, except that this embodiment has a coating 340 in the recess 120 on the surface 124 of the conductive layer 112. In one embodiment, the coating 340 is an artificial solid electrolyte interphase (SEI) formed on the surface 124 of the conductive layer 112 in the recess 120. This artificial SEI can be formed of lithium-containing fluorides, nitrites, oxides and carbonates. Non-limiting examples include LiF and $Li_3N$. The artificial SEI promotes and stabilizes lithium deposition. The artificial SEI can be precoated directly onto the surface 124 of the conductive layer 112 or can be added as additives to the electrolyte for form the artificial SEI during cycling.

In another embodiment, the coating 340 is anode active material to promote deposition and provide activity. The anode active material may be lithium, silicon, carbon, titanium, and other materials known by those skilled in the art as appropriate anode active material.

The anode current collector host structures disclosed herein can be made by any process known to those skilled in the art. As a non-limiting example, the host structures can be made with 3D printing. As another non-limiting example, the host structures can be made by layering the two materials and forming the recesses therein by means such as laser ablation or etching.

Unless defined otherwise, all technical and scientific terms used herein have the same meanings as commonly understood by one of ordinary skill in the art to which this disclosure belongs. Preferred methods, techniques, devices and materials are described although any methods, techniques, devices, or materials similar or equivalent to those described may be used in the practice or testing of the present disclosure. Structures described herein are to be understood also to refer to functional equivalents of such structures.

It must be noted that as used herein and in the appended claims, the singular forms "a," "an," and "the" include the plural reference unless the context clearly dictates otherwise. Thus, for example, a reference to "an element" is a reference to one or more elements, and includes equivalents thereof known to those skilled in the art.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A lithium metal battery, comprising:
   a cathode current collector;
   a cathode active material layer;
   an electrolyte; and
   an anode current collector host structure interfacing with the electrolyte, the anode current collector host structure comprising:
      a conductive layer;
      a non-conductive layer on the conductive layer; and
      recesses formed through the non-conductive layer and into the conductive layer, each of the recesses having an opening in the non-conductive layer with a width that is smaller than a largest width of a respective recess.

2. The lithium metal battery of claim 1, wherein the width of the opening is 20% to 70% the largest width of the respective recess.

3. The lithium metal battery of claim 1, wherein each of the recesses is a channel having a widest dimension that is larger than an opening of a respective channel.

4. The lithium metal battery of claim 1, wherein the recess is a hole having a widest diameter that is larger than an opening of a respective hole.

5. The lithium metal battery of claim 1, wherein each of the recesses has a depth and the anode current collector host structure has a thickness, and the depth is between 50% and 95% the thickness.

6. The lithium metal battery of claim 1, wherein the anode current collector host structure has a first thickness, and the non-conductive layer has a second thickness, the second thickness being between 30% and 70% of the first thickness.

7. The lithium metal battery of claim 1, wherein the non-conductive layer is non-conductive to ions and electrons.

8. The lithium metal battery of claim 1, wherein the non-conductive layer is non-conductive to electrons.

9. The lithium metal battery of claim 8, wherein the non-conductive layer comprises a solid ceramic electrolyte.

10. The lithium metal battery of claim 1, wherein the electrolyte at least partially fills the recesses.

11. The lithium metal battery of claim 1, further comprising:
    an artificial SEI layer on a surface of the conductive layer within each of the recesses.

12. An anode current collector host structure configured to interface with an electrolyte, the anode current collector host structure comprising:
    a conductive layer of metal;
    a non-conductive layer formed on the conductive layer; and
    recesses formed across an entire cathode-facing surface of the non-conductive layer, through the non-conductive layer and into the conductive layer, each of the recesses having an opening in a cathode-facing surface of the non-conductive layer with a width that is smaller than a largest width of a respective recess, wherein the electrolyte at least partially fills the recesses.

13. The anode current collector host structure of claim 12, wherein the width of the opening of the recess is 20% to 70% the largest width of the respective recess.

14. The anode current collector host structure of claim 12, wherein each of the recesses is a channel having a widest dimension that is larger than an opening of a respective channel.

15. The anode current collector host structure of claim 12, wherein each of the recesses is a hole having a widest diameter that is larger than an opening of a respective hole.

16. The anode current collector host structure of claim 12, wherein each of the recesses has a depth and the anode current collector host structure has a thickness, and the depth is between 50% and 95% the thickness.

17. The anode current collector host structure of claim 12, wherein the anode current collector host structure has a first thickness, and the non-conductive layer has a second thickness, the second thickness being between 30% and 70% of the first thickness.

18. The anode current collector host structure of claim 12, further comprising:

an artificial SEI layer on a surface of the conductive layer within each of the recesses.

19. The anode current collector host structure of claim 12, wherein the non-conductive layer does not conduct electrons but does conduct ions and comprises a solid ceramic electrolyte.

20. A lithium metal battery, comprising:
a cathode current collector;
a cathode active material layer comprising a lithium transition metal oxide or a lithium transition metal phosphate;
an electrolyte that is a liquid, gel, polymer or combination thereof; and
an anode current collector host structure interfacing with the electrolyte, the anode current collector host structure comprising:
a conductive layer of metal;
a non-conductive layer formed on the conductive layer; and
recesses formed through the non-conductive layer and into the conductive layer, each of the recesses having an opening on a cathode-facing surface of the non-conductive layer with a width that is smaller than a largest width of a recess, the width of the opening being between 20% and 70% the largest width of the recess.

* * * * *